United States Patent
Goldmeer et al.

(10) Patent No.: US 7,178,339 B2
(45) Date of Patent: Feb. 20, 2007

(54) CLOSED-LOOP COOLING SYSTEM FOR A HYDROGEN/OXYGEN BASED COMBUSTOR

(75) Inventors: Jeffrey S. Goldmeer, Latham, NY (US); William H. Girodet, Palm Beach Gardens, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 221 days.

(21) Appl. No.: 10/819,857

(22) Filed: Apr. 7, 2004

(65) Prior Publication Data

US 2005/0223711 A1 Oct. 13, 2005

(51) Int. Cl.
*F02C 3/30* (2006.01)

(52) U.S. Cl. ........................ 60/775; 60/39.53

(58) Field of Classification Search ............. 60/775, 60/39.181, 39.3, 39.53, 39.511
See application file for complete search history.

(56) References Cited

U.S. PATENT DOCUMENTS

| | | | |
|---|---|---|---|
| 4,649,091 A | | 3/1987 | McElroy |
| 4,896,507 A | * | 1/1990 | Hosford .................... 60/641.8 |
| 4,942,733 A | * | 7/1990 | Hosford ........................ 60/267 |
| 5,177,952 A | * | 1/1993 | Stone ........................... 60/775 |
| 5,192,627 A | | 3/1993 | Perry, Jr. et al. |
| 5,316,869 A | | 5/1994 | Perry, Jr. et al. |
| 5,644,911 A | * | 7/1997 | Huber ........................... 60/775 |
| 5,687,559 A | * | 11/1997 | Sato ........................ 60/39.182 |
| 5,775,091 A | * | 7/1998 | Bannister et al. ............. 60/775 |
| 5,782,081 A | * | 7/1998 | Pak et al. ................. 60/39.181 |
| 6,062,018 A | | 5/2000 | Bussing |
| 6,265,092 B1 | | 7/2001 | Meltser et al. |
| 6,268,074 B1 | | 7/2001 | Siepierski et al. |
| 6,272,849 B1 | * | 8/2001 | Zanini-Fisher et al. ....... 60/275 |
| 6,282,883 B1 | * | 9/2001 | Uematsu et al. ......... 60/39.182 |
| 6,350,535 B1 | | 2/2002 | Kralick |
| 6,383,671 B1 | | 5/2002 | Andrews et al. |
| 6,511,052 B1 | | 1/2003 | Tonkin et al. |
| 6,576,359 B2 | | 6/2003 | Fronk |
| 6,610,193 B2 | * | 8/2003 | Schmitman .................. 205/628 |
| 6,808,145 B2 | * | 10/2004 | Burton ...................... 244/171.1 |

(Continued)

OTHER PUBLICATIONS

"Japan successfully tests fuel cell ocean probe vehicle", retrieved from Fuel Cell Today Web site: http://www.fuelcelltoday.com/FuelCellToday/IndustryInformation/IndustryInformationExternal/NewsDisplayArticle/0%2C1602%2C3264%2C00.html.

*Primary Examiner*—William H. Rodriguez
(74) *Attorney, Agent, or Firm*—Scully, Scott, Murphy & Presser, P.C.

(57) ABSTRACT

A closed-loop cooling system is provided for a hydrogen/oxygen based combustor. A combustion reaction between hydrogen and oxygen in the combustor produces steam. The steam is used to generate work from a turbine shaft, which is used to drive a propulsion system for the underwater vessel. After the steam passes through the turbine, the steam is cooled back to liquid water by a condenser that uses a seawater cooling loop to cool the steam into cold water. The cold water is then injected into the combustor, and pumped into passages along the walls of the combustor, thus absorbing the heat. The cold water absorbs this heat until it becomes hot water or steam, which is then injected into the combustor with the hydrogen and oxygen to act as a diluent, thus reducing the reaction temperature of the hydrogen/oxygen combustion reaction. The reaction produces more steam, and the cycle repeats.

33 Claims, 2 Drawing Sheets

U.S. PATENT DOCUMENTS

| | | | |
|---|---|---|---|
| 6,846,208 B1* | 1/2005 | Goldmeer et al. | 440/3 |
| 6,846,209 B2* | 1/2005 | Lewis et al. | 440/6 |
| 6,978,617 B2* | 12/2005 | Goldmeer et al. | 60/698 |
| 2002/0095931 A1* | 7/2002 | Sugishita et al. | 60/39.12 |
| 2004/0148923 A1* | 8/2004 | Hewitt | 60/257 |
| 2005/0008904 A1* | 1/2005 | Suppes | 429/9 |
| 2005/0126155 A1* | 6/2005 | Thordarson | 60/39.6 |
| 2005/0166574 A1* | 8/2005 | Michel Dujarric | 60/203.1 |
| 2005/0198958 A1* | 9/2005 | Haase | 60/641.8 |
| 2005/0252214 A1* | 11/2005 | Goldmeer et al. | 60/698 |

* cited by examiner

CLOSED-LOOP COOLING SYSTEM FOR A HYDROGEN/OXYGEN BASED COMBUSTOR

BACKGROUND OF THE INVENTION

1. Field of the Invention

The present invention relates to cooling systems for marine vessels, and more specifically, to a closed-loop cooling system for a hydrogen/oxygen based combustor used in an underwater marine vessel.

2. Prior Art

Vehicles that operate underwater are useful for performing tasks below the sea surface in such fields as deep-water salvage operations, navy and marine operations, underwater telecommunications, offshore petroleum and mining, and oceanographic research. Many of these applications are completed by small-scale underwater vehicles that can be either manned or unmanned (robotic or remote controlled). These unmanned vehicles are commonly known as Unmanned Underwater Vehicles (UUVs).

Conventional power systems for these vehicles run an open cycle that consumes some type of fuel and the reaction products are expelled from the vessel. Generally, the traditional combustion systems for these small-scale underwater vessels have used open loop cooling with either air or water. Open loop combustion systems, such as an aircraft or automotive engines, will eject or exhaust the products of the reaction used to generate power.

In the case of an open system such as a missile or torpedo, ejecting mass can be used to generate thrust and propel the vessel. Vessels operating underwater that eject or exhaust mass tend to rise as they become more buoyant. By expelling this mass from the vessel, the vessel becomes more buoyant and tends to rise, thus making it more likely that the vehicle will be spotted or detected. This is a problem for vehicles involved in covert operations. This problem could be mitigated, but it requires complex mechanical systems that significantly increase the associated costs.

Furthermore, the cooling systems for these open-loop combustion systems require outside water, air or other fluids to cool the engines. Modem gas turbine combustion systems have established a number of open loop air-based methods for cooling combustion systems. Additionally, modem gas turbine combustion systems require cooling by active or passive means to absorb and/or redistribute the heat generated by exothermic chemical reactions.

One method for redistributing and utilizing this excess heat is to pass a cooling fluid (gas or liquid) around the combustor to absorb this energy and then inject this fluid into the combustor, in a process known as reverse-flow cooling. In a gas turbine, this has the effect of cooling combustor hardware. Additionally, this fluid can be injected into the combustor to be used as a combustion reactant and/or as a heat sink to reduce flame temperature and/or emissions. These are all open loop methods that eject the cooling fluid from the system.

To eliminate the problem of increasing buoyancy caused by ejecting mass from an open loop system, an underwater vessel could operate with a closed loop power/propulsion system. This limits the amount of mass leaving the vessel and maintains a neutrally buoyant vessel. However, this system would also require a closed loop cooling system. The term closed loop cycle implies that none of the working fluid enters or leaves the power system while in operation. Therefore, there is a need for a closed-loop cooling system for hydrogen/oxygen based combustion systems.

SUMMARY OF THE INVENTION

Therefore, it is an object of the present invention to provide a cooling system for an underwater vessel that is neutrally buoyant so that the vessel does not rise or sink by providing a closed-loop cooling system in which outside air or water is not required. Closed systems do not eject mass into the surroundings, or require any external air or water for cooling the system, which makes the vessel neutrally buoyant and potentially more maneuverable.

In the specific case of a system utilizing a hydrogen/oxygen combustion reaction, the system has inherently high flame and exhaust temperatures. The hydrogen/oxygen reaction has an adiabatic flame temperature of 5000 degrees Fahrenheit (3080 Kelvin) at stoichiometric conditions. This requires cooling of the combustor and the combustor exhaust flow. Diluting the reaction gases (hydrogen and oxygen) with water or steam can reduce the reaction temperature. In the case of a hydrogen/oxygen closed loop system, the closed-loop cooling system can utilize the notion that only steam and water flow through the combustion exhaust/cooling loop.

Accordingly, an apparatus for a closed-loop cooling system for an underwater vessel is provided. The apparatus for cooling a hydrogen/oxygen based combustor for an underwater vessel comprises a combustor having a combustion chamber in which a combustion reaction of hydrogen and oxygen produces steam, a condenser for condensing the steam from the combustion chamber to water, and means for injecting the water from the condenser into the combustor to absorb heat from the combustion chamber.

The apparatus for cooling a hydrogen/oxygen based combustor for an underwater vessel further comprises means for injecting hot water or steam into the combustion chamber, the hot water or steam being formed by the absorption of heat by the water. The combustor can be a constant pressure system, or a constant volume system, such as a Pulse Detonation Engine. The Pulse Detonation Engine can use a Deflagration to Detonation transition based system, in which one-dimensional tubes are closed on one end, and the fuel (hydrogen) and oxidizer (oxygen) are injected into the closed end.

The apparatus for cooling a hydrogen/oxygen based combustor for an underwater vessel further comprises means for ducting the steam from the combustor to a turbine to rotate a shaft of the turbine. A generator can use the rotating turbine shaft to generate electricity to drive a propulsion system for the underwater vessel. A gear and clutch system can also use the rotating turbine shaft to turn gear sets of a gear and clutch system to drive a propulsion system for the underwater vessel.

The apparatus for cooling a hydrogen/oxygen based combustor for an underwater vessel further comprises means for cooling the steam in the condenser into water. The means for cooling can be a seawater cooling loop running through the condenser. The water from the condenser can be stored in a water supply.

The apparatus for cooling a hydrogen/oxygen based combustor for an underwater vessel further comprises an electrolyzer for breaking down water in the water supply into hydrogen and oxygen. The hydrogen is stored in a hydrogen supply and the oxygen is stored in an oxygen supply. The combustor uses the hydrogen and oxygen in the hydrogen supply and oxygen supply, respectively, to initiate the combustion reaction, and the hydrogen supply and oxygen supply are both in fluid communication with the combustor.

The apparatus for cooling a hydrogen/oxygen based combustor for an underwater vessel further comprises a computer that controls an amount and flow rate of hydrogen and oxygen into the combustor, controls an amount and flow rate of steam into the condenser, and controls an amount and flow rate of water injected into the combustor.

Further, a closed-loop cooling method for cooling a hydrogen/oxygen based combustor for an underwater vessel is provided, the method comprising initiating a combustion reaction between hydrogen and oxygen in a combustion chamber in the combustor to form steam, condensing the steam from the combustion chamber into water, and injecting the water into the combustor to absorb heat from the combustion chamber.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Although this invention is applicable to numerous and various types of combustion cooling systems, it has been found particularly useful in the environment of closed-loop cooling systems for hydrogen/oxygen based combustion systems for small-scale underwater vessels and UUVs. Therefore, without limiting the applicability of the invention to the above, the invention will be described in such environment.

Figure 1:
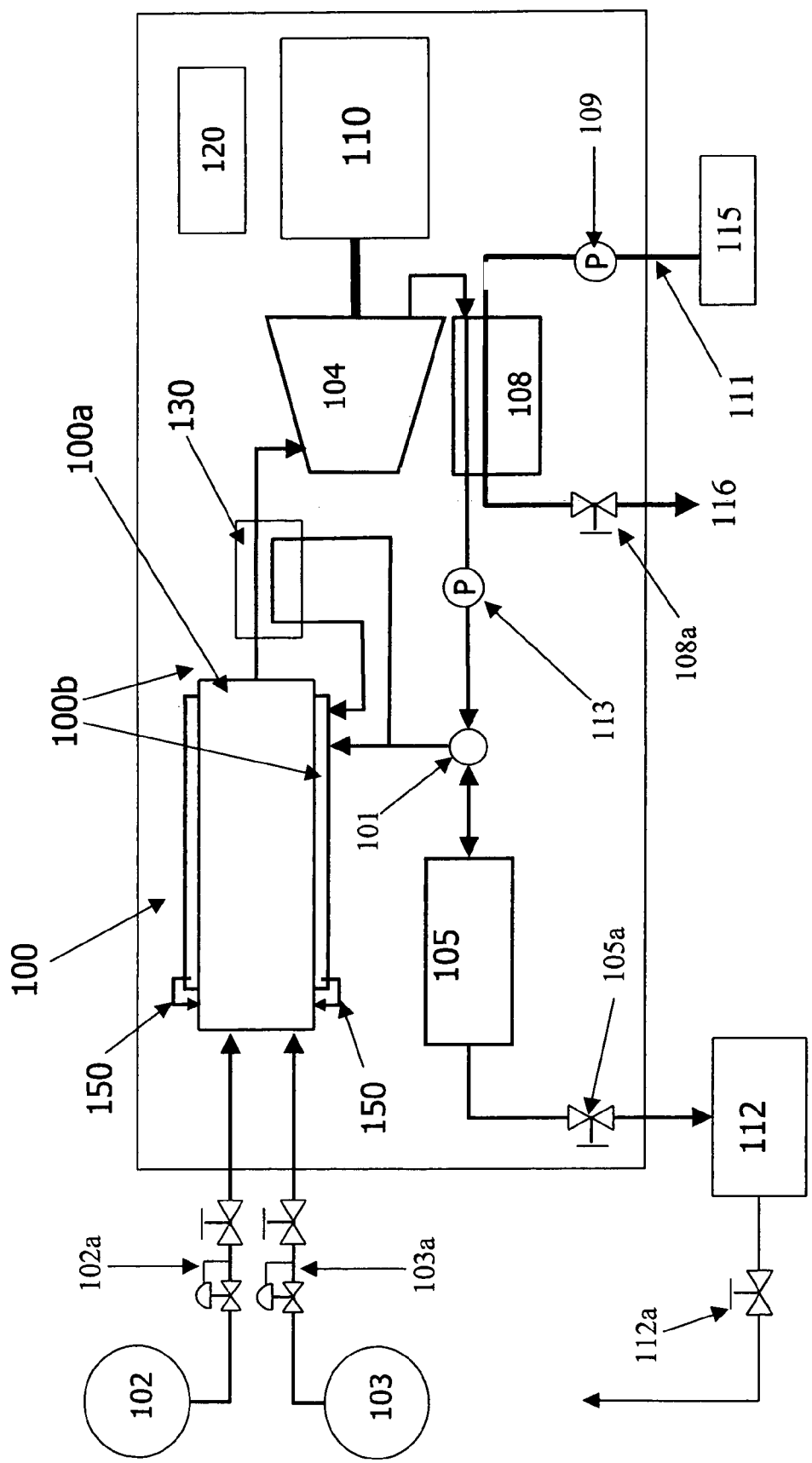
FIG. 1 illustrates a schematic representation of a general embodiment of a closed-loop combustion cooling system according to the present invention.

With reference to FIG. 1, there is a schematic representation of a closed loop cooling system for an underwater vessel. Hydrogen is stored in a hydrogen supply 102 and oxygen is stored in an oxygen supply 103. For example, the hydrogen supply 102 and oxygen supply 103 can be pressurized tanks containing the fuel and oxidizer, respectively, with the related control and safety elements 102a and 103a. The hydrogen supply 102 and the oxygen supply 103 are in fluid communication with a hydrogen/oxygen based combustor 100, which is preferably a Pulse Detonation Engine (PDE). The hydrogen and oxygen gases stored in the hydrogen supply 102 and the oxygen supply 103, respectively, are the reactants for the combustor 100.

The combustor 100 uses oxygen from the oxygen supply 103 and hydrogen from the hydrogen supply 102 to initiate a combustion reaction between the oxygen and hydrogen. The hydrogen and oxygen are used as the fuel and oxidizer, respectively, and produce water vapor (steam) as a product of the combustion reaction. The hydrogen and oxygen are injected into the combustion chamber 100a. The hydrogen/oxygen reaction has an adiabatic flame temperature of 5000 degrees Fahrenheit (3080 Kelvin) at stoichiometric conditions. Appropriate control systems, 102a for the hydrogen, 103a for the oxygen, are used to regulate the amount and flow rate of hydrogen and oxygen, respectively, to be injected into the combustion chamber 100a. The amount of hydrogen and oxygen injected into the combustion chamber 100a is proportional to the amount of power required by the underwater vessel.

Figure 2:
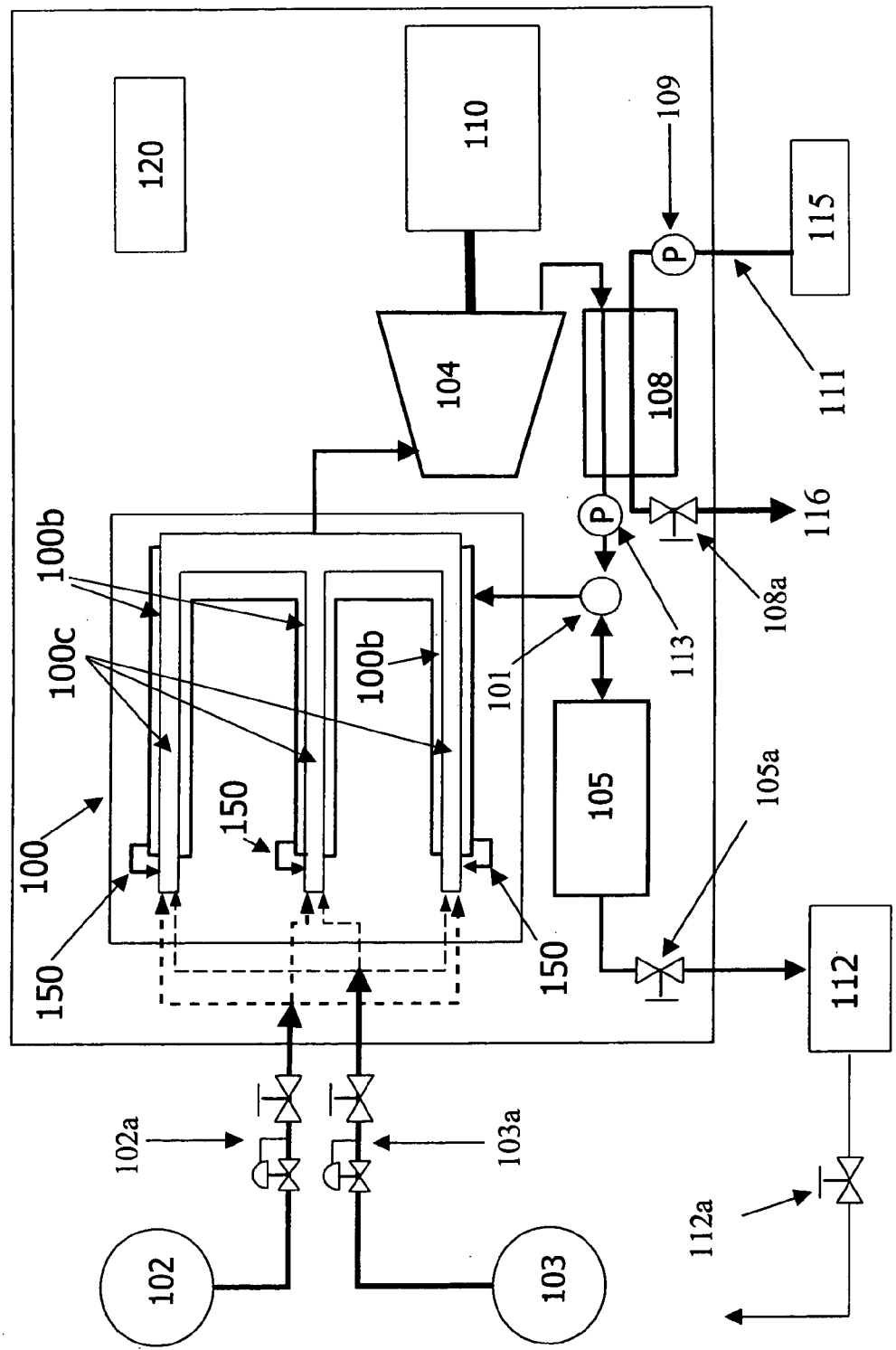
FIG. 2 illustrates a schematic representation of a specific embodiment of a closed-loop combustion cooling system according to the present invention.

The combustor 100 can be a constant pressure combustion system or a constant volume (pressure rise) combustion system. Combustion systems such as candles, home heaters, gas ovens and stoves, etc., are deflagration-based combustion reactions, which are constant-pressure systems with sub-sonic flows. In contrast, constant volume combustion reactions generate an increase in pressure within the system, and may involve supersonic flows and shock waves. Thus, the output pressure from a constant volume reaction will be larger than the inlet pressure of the reactants, which will lead to increased power generation for a specific fuel consumption, leading to increased overall system efficiency. One example of a constant volume (increasing pressure) based system is a Pulse Detonation Engine (PDE), as shown in FIG. 2.

A PDE-based combustion system provides an efficiency increase to the system over conventional (deflagration) combustion systems. A PDE-based combustion system is a pulsed system, in which detonation reactions generate a shock wave, which generates a very short duration pressure pulse. If a time-series of pressure pulses are created and at a sufficiently high enough frequency, the time integrated pressure will be larger than the initial pressure. This time averaged pressure in the combustion exhaust stream would increase the output power from the turbine for a specific fuel flow rate, thus increasing the efficiency of the overall system.

The Pulse Detonation Engine can use a Deflagration to Detonation Transition (DDT) based system. A DDT system uses a one-dimensional tube that is closed on one end. The fuel (hydrogen) and oxidizer (oxygen) are injected into the closed end. An energy source (such as a spark plug, etc) is used to ignite the mixture of the fuel and oxidizer. The combustion wave then begins to propagate towards the open end of the tube at subsonic speeds (deflagration). As the combustion wave propagates, it accelerates until a shock wave is formed and the flow transitions to sonic speeds (detonation). The tube is then purged and the process can then be repeated.

Alternatively, other types of engines (constant volume or constant pressure) can be used as the combustor 100, which employ similar combustion reactions between hydrogen and oxygen.

The combustion reaction of the hydrogen and oxygen produces water vapor (steam) and water. Water generated by the combustion reaction can be stored in a water tank 105, which may have an initial amount of water stored that could be required at the start-up of the combustor. The water vapor (steam) generated by the combustion reaction in the combustor 100 is ducted to a turbine 104, which expands the steam to generate power for a turbine shaft. Generally, the turbine 104 could be any type of turbine capable of extracting work from the steam, but could specifically be a steam turbine. The shaft of the turbine 104 is connected to a generator 110 that provides electrical power for the underwater vessel. In the present embodiment, the electrical power from the generator 110 is used to drive a propulsion system (not shown) for the underwater vessel.

After useful work has been extracted from the steam by the turbine, the steam exiting the turbine 104 requires significant cooling. For a system operating in an underwater vessel, the system could take advantage of the nearly unlimited supply of cold, ambient seawater available exterior to the vessel for use as a coolant. Such cold water is nearly in infinite supply for an underwater vessel.

Therefore, steam exiting the turbine 104 is ducted to a condenser 108, which is used to condense the steam into liquid water through a seawater cooling loop 111. Seawater enters the seawater cooling loop 111 through a seawater intake 115 provided at the exterior of the underwater vessel, and exits the seawater cooling loop 111 through a seawater outlet 116. The seawater cooling loop 111 provides cold seawater for the condenser 108. The amount and flow rate of the cold seawater in the seawater cooling loop 111 through the seawater intake 115, the amount of steam being cooled in the condenser 108, and the amount of seawater exiting the seawater cooling loop 111 through seawater outlet 116 are regulated by controls 108a and a pump 109. Condensers known in the art for cooling steam can be used for this application.

After circulating the seawater through the seawater cooling loop 111 to cool the steam from the turbine 104, the condensed water from the condenser 108 is pumped to either the water storage tank 105 or to the combustor by pump 113. The water storage tank may have an initial amount of water already stored inside of it. The water pumped to the combustor 100 can be used to cool the combustor 100. Extra water from the condenser 108 is stored in the water supply 105. The water supply 105, the condenser 108, and the combustor 100 are in fluid communication with each other.

Cold water from the condenser 108 is drawn by a pump 113 and injected into passages 100b of the combustor 100 to provide a coolant for the combustor 100. The passages 100b are provided on the outside of the combustion chamber 100a. The amount and flow rate of the cold water from the condenser 108 to the combustor 100 and water supply 105 are regulated by controls 101. Controls 101 also provide for the amount and flow rate of water from the water supply 105 to the combustor 100, if extra cold water is required.

The cold water is pumped or injected into passages 100b provided around the combustion chamber 100a, allowing the cold water to act as a coolant by absorbing excess heat from the combustion chamber 100a, thus cooling the combustor 100. As the cold water flows through passages 100b, it absorbs the heat and becomes heated until it is very hot water or steam.

Once the cold water in passages 100b cools the combustor 100 and becomes hot water or steam, this hot water or steam is then injected into the combustion chamber 100a from the passages 100b. Now, the hot water or steam enters the combustion chamber 100a along with the hydrogen and oxygen from the hydrogen supply 102 and oxygen supply 103, respectively. The hot water or steam can be injected into the combustion chamber 100a from the passages 100b through an injecting means 150. The hot water or steam acts as a diluent in the chemical reaction between the hydrogen and oxygen in the combustion reaction, thus reducing the reaction temperature during the combustion reaction between the hydrogen and oxygen. This combustion reaction produces more steam that is ducted to the steam turbine 104, and the cycle repeats. Thus, the system is a "closed-loop", not requiring any outside air or water to enter or exit to cool the system while in operation.

Cold water from the condenser 108 can also be directed to a heat exchanger 130. As stated above, the hydrogen/oxygen reaction in the combustor 100 has an adiabatic flame temperature of 5000 degrees Fahrenheit (3080 Kelvin) at stoichiometric conditions. Even after the hot water from passages 100b is injected into the combustor chamber 100a, the exhaust flow could be hot enough to damage the blades of steam turbine 104. Cooling of the combustor exhaust flow can be accomplished by controls 101 sending water from the condenser 108 to heat exchanger 130. Thus, the temperature of the product of the hydrogen/oxygen reaction in the combustor 100 is significantly reduced before it enters the steam turbine 104. The heat exchanger takes heat from the steam produced by the hydrogen/oxygen reaction in the combustor 100, and transfers this energy into the water from the condenser 108. This significantly reduces the temperature of the steam before it enters the steam turbine 104, thus causing less stress on the blades of the steam turbine 104.

FIG. 2 shows a preferred embodiment of the present invention, in which a series of combustion chamber tubes 100c are used. These tubes comprise a Pulse Detonation Engine comprising a series of Deflagration to Detonation Transition (DDT) tubes. DDT tubes are one-dimensional tubes that are closed on one end, and the fuel (hydrogen) and oxidizer (oxygen) are injected into the closed end, as recited above.

In the embodiment shown in FIG. 2, cold water from the condenser 108 is drawn by a pump 113 and injected into passages 100b provided around the combustion chamber tubes 100c of the combustor 100, to provide a coolant for the combustor 100. The amount and flow rate of the cold water from the condenser 108 to the combustor 100 and water supply 105 are regulated by controls 101. Controls 101 also provide for the amount and flow rate of water from the water supply 105 to the combustor 100, if extra cold water is required.

The cold water is pumped or injected into passages 100b provided around the combustion chamber tubes 100c, allowing the cold water to act as a coolant by absorbing excess heat from the combustion chamber tubes 100c, thus cooling the combustor 100. As the cold water flows through passages 100b, it absorbs the heat and becomes heated until it is very hot water or steam.

Once the cold water in passages 100b cools the combustion chamber tubes 100c and becomes hot water or steam, this hot water or steam is then injected into the combustion chamber tubes 100c from the passages 100b. Now, the hot water or steam enters the combustion chamber tubes 100c along with the hydrogen and oxygen from the hydrogen supply 102 and oxygen supply 103, respectively. The hot water or steam can be injected into the combustion chamber tubes 100c from the passages 100b through an injecting means 150. The hot water or steam acts as a diluent in the chemical reaction between the hydrogen and oxygen in the combustion reaction, thus reducing the reaction temperature during the combustion reaction between the hydrogen and oxygen. This combustion reaction produces more steam that is ducted to the steam turbine 104, and the cycle repeats. Thus, the system is a "closed-loop", not requiring any outside air or water to enter or exit to cool the system while in operation.

The only external fluid that is required is the seawater in the seawater cooling loop 111, which is used to cool the steam in the condenser 108. But since an equal amount of this water enters and leaves the system at any given point in time, this does not affect the overall buoyancy of the system.

This closed-loop system requires a fuel and oxidizer combination (hydrogen supply 102 and oxygen supply 103, respectively) that are used by the combustor 100, and the products of the combustion reaction must be capable of being transformed back into the original reactants. These requirements are easily met by hydrogen and oxygen, which when reacted in stoichiometric proportion produce water vapor:

$$H_2 + 1/2 O_2 \rightarrow H_2O$$

In a combustion system, work can be extracted from the resulting high temperature steam, and electrical power can be generated from a fuel cell using the same reactants. For this to be a true closed loop system, the reaction product must be converted back into the reactants. In this case the reaction product, water ($H_2O$), can be chemically reduced into the constituent hydrogen ($H_2$) and oxygen ($O_2$) with the addition of electricity:

$$H_2O + (e^-) \rightarrow H_2 + 1/2 O_2$$

This process is known as electrolysis. In the present invention, the stored water in the water supply 105 is converted back into $H_2$ and $O_2$ by running an electrolyzer 112 or catalytic generator as an electrolysis system. The amount and flow rate of the water from the water supply 105 to the electrolyzer 112 are regulated by control 105a. The necessary amount of water is broken down based on how much hydrogen and oxygen is required by the combustor 100, and on the level of hydrogen and oxygen in the hydrogen supply 102 and oxygen supply 103, respectively.

The electrolyzer 112 reduces the water from the water supply 105 back into $H_2$ and $O_2$. The amount and flow rate of the hydrogen and oxygen from the electrolyzer 112 to the hydrogen supply 102 and oxygen supply 103, respectively, are regulated by controls 112a. The hydrogen and oxygen are stored back (not shown) into the hydrogen supply 102 and oxygen supply 103, respectively. The electrolyzer 112 is powered by an external supply that might or might not be contained in the underwater vessel. Thus, this closed-loop cooling system does not exhaust any of the water, hydrogen or oxygen from the cycle to the local ambient environment.

Further, a computer 120 provides for a control system for the closed-loop cooling system. The computer 120 is able to control the amount and flow rate of the steam ducted to the turbine 104 and the condenser 108 by controlling the amount and flow rate of hydrogen and oxygen injected into the combustor 100. Turbine power is also controlled by the computer 120 by controlling the hydrogen, oxygen and water/steam flow rates. The computer 120 also controls the rotation of the turbine shaft, the amount and flow rate of the cold seawater in the seawater cooling loop 111, the amount and flow rate of the cold water to the water supply 105 and the combustor 100 from the condenser 108, the amount and flow rate of the water to the combustor 100 and electrolyzer 112 from the water supply 105, the amount of water that is reduced to $H_2$ and $O_2$ in the electrolyzer 112, and the amount and flow rate of the $H_2$ and $O_2$ into the hydrogen supply 102 and oxygen supply 103, respectively, from the electrolyzer 112.

The computer is also able to monitor and manage controls 102a, 103a, 108a, 101, 105a and 112a, and pumps 109 and 113. Factors such as the levels of hydrogen, oxygen, steam and water in the closed-loop system are all taken into account by the computer 120 depending on how much power is required from the combustion system at any time.

The computer 120 is not limited by the above, and may control various other aspects of the closed-loop cooling system as would be known to one of ordinary skill in the art.

The closed-loop cooling system of the present invention may be used to operate various drive systems, such as a direct-drive system. For example, the shaft of the turbine 104 can be connected to a gear and clutch system, which can be used to drive a propulsion system for the underwater vessel. When a combustion reaction is initiated in the combustor 100, the gear and clutch system is engaged, and the shaft of the turbine 104 turns the gear sets of the gear and clutch system, which drives the propulsion system for the underwater vessel. In this embodiment, reference numeral 110 represents the gear and clutch system rather than the generator described above.

The above description of the present invention does not limit different embodiments of the present invention. Various other combinations of closed-loop cooling systems are also possible, in which different types of combustion engines (constant pressure systems or constant volume systems) are used. Further, the underwater vessel can be either manned or unmanned (remotely controlled).

The present invention provides several advantages that solves the problems with prior art methods. A closed-loop cooling system is provided for a hydrogen/oxygen based combustor, such as a Pulse Detonation Engine. The closed-loop cooling system ensures that material is not ejected out of the vessel. Thus, the vehicle maintains neutral buoyancy, which is important for the maneuvering capability of submersible vehicles, and limits external disturbances that could add to the vehicle's signature.

Further, the system utilizes an electrolyzer to convert stored water back into hydrogen and oxygen, for re-use by the combustion engine 100. Thus, the reactants or products are not exhausted.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for cooling a hydrogen/oxygen based combustor for an underwater vessel, said apparatus comprising:
   a constant volume combustor system having a combustion chamber in which a combustion reaction of hydrogen and oxygen produces steam;
   a condenser for condensing the steam from the combustion chamber to water; and
   means for injecting the water from the condenser into the combustor to absorb heat from the combustion chamber.

2. The apparatus for cooling a hydrogen/oxygen based combustor for an underwater vessel of claim 1, wherein said combustor comprises a constant pressure system.

3. The apparatus for cooling a hydrogen/oxygen based combustor for an underwater vessel of claim 1, wherein said constant volume system comprises a Pulse Detonation Engine.

4. The apparatus for cooling a hydrogen/oxygen based combustor for an underwater vessel of claim 3, wherein the Pulse Detonation Engine uses a Deflagration to Detonation transition based system.

5. The apparatus for cooling a hydrogen/oxygen based combustor for an underwater vessel of claim 1, further comprising means for ducting said steam from said combustor to a turbine to rotate a shaft of said turbine.

6. The apparatus for cooling a hydrogen/oxygen based combustor for an underwater vessel of claim 5, further comprising a generator that uses said rotating turbine shaft to generate electricity to drive a propulsion system for said underwater vessel.

7. The apparatus for cooling a hydrogen/oxygen based combustor for an underwater vessel of claim 5, further comprising a gear and clutch system that uses said rotating turbine shaft to turn gear sets of said gear and clutch system to drive a propulsion system for said underwater vessel.

8. The apparatus for cooling a hydrogen/oxygen based combustor for an underwater vessel of claim 1, further comprising a means for cooling said steam in said condenser into water.

9. The apparatus for cooling a hydrogen/oxygen based combustor for an underwater vessel of claim 8, wherein said means for cooling comprises a seawater cooling loop that runs seawater through said condenser.

10. The apparatus for cooling a hydrogen/oxygen based combustor for an underwater vessel of claim 9, wherein water from said condenser is stored in a water supply.

11. The apparatus for cooling a hydrogen/oxygen based combustor for an underwater vessel of claim 10, further comprising an electrolyzer for breaking down water in the water supply into hydrogen and oxygen.

12. The apparatus for cooling a hydrogen/oxygen based combustor for an underwater vessel of claim 11, wherein said hydrogen is stored in a hydrogen supply and said oxygen is stored in an oxygen supply.

13. The apparatus for cooling a hydrogen/oxygen based combustor for an underwater vessel of claim 12, wherein said combustor uses said hydrogen and oxygen in said hydrogen supply and oxygen supply, respectively, to initiate said combustion reaction, and wherein said hydrogen supply and oxygen supply are both in fluid communication with said combustor.

14. The apparatus for cooling a hydrogen/oxygen based combustor for an underwater vessel of claim 1, further comprising a computer that controls an amount and flow rate of hydrogen and oxygen into said combustor, controls an amount and flow rate of steam into the condenser, and controls an amount and flow rate of water injected into the combustor.

15. An apparatus for cooling a hydrogen/oxygen based combustor for an underwater vessel, said apparatus comprising:
   a combustor having a combustion chamber in which a combustion reaction of hydrogen and oxygen produces steam;
   a condenser for condensing the steam from the combustion chamber to water; means for injecting the water from the condenser into the combustor to absorb heat from the combustion chamber; and
   means for injecting hot water or steam into the combustion chamber, said hot water or steam being formed by the absorption of heat by the water.

16. The apparatus for cooling a hydrogen/oxygen based combustor for an underwater vessel of claim 15, wherein said absorption of heat by the water occurs by cooling the combustor.

17. A closed-loop cooling method for cooling a hydrogen/oxygen based combustor for an underwater vessel, the method comprising:
   initiating a constant volume combustion reaction between hydrogen and oxygen in a combustion chamber in said combustor to form steam;
   condensing the steam from the combustion chamber into water; and
   injecting the water into the combustor to absorb heat from the combustion chamber.

18. The closed-loop cooling method for cooling a hydrogen/oxygen based combustor for an underwater vessel of claim 17, wherein said combustor comprises a constant pressure system.

19. The closed-loop cooling method for cooling a hydrogen/oxygen based combustor for an underwater vessel of claim 17, wherein said constant volume system comprises a Pulse Detonation Engine.

20. The closed-loop cooling method for cooling a hydrogen/oxygen based combustor for an underwater vessel of claim 19, wherein the Pulse Detonation Engine uses a Deflagration to Detonation transition based system.

21. The closed-loop cooling method for cooling a hydrogen/oxygen based combustor for an underwater vessel of claim 17, further comprising ducting said steam from said combustor to a turbine to rotate a shaft of said turbine.

22. The closed-loop cooling method for cooling a hydrogen/oxygen based combustor for an underwater vessel of claim 21, further comprising using said rotating turbine shaft to generate electricity to drive a propulsion system for said underwater vessel.

23. The closed-loop cooling method for cooling a hydrogen/oxygen based combustor for an underwater vessel of claim 21, further comprising using said rotating turbine shaft to turn gear sets to drive a propulsion system for said underwater vessel.

24. The closed-loop cooling method for cooling a hydrogen/oxygen based combustor for an underwater vessel of claim 17, wherein said condensing step comprises utilizing seawater to cool said steam.

25. The closed-loop cooling method for cooling a hydrogen/oxygen based combustor for an underwater vessel of claim 17, wherein after said condensing step said water is stored in a water supply.

26. The closed-loop cooling method for cooling a hydrogen/oxygen based combustor for an underwater vessel of claim 25, further comprising breaking down water in the water supply into hydrogen and oxygen.

27. The closed-loop cooling method for cooling a hydrogen/oxygen based combustor for an underwater vessel of claim 26, further comprising storing said hydrogen in a hydrogen supply and storing said oxygen in an oxygen supply.

28. The closed-loop cooling method for cooling a hydrogen/oxygen based combustor for an underwater vessel of claim 27, further comprising the combustor using said hydrogen and oxygen in said hydrogen supply and oxygen supply, respectively, to initiate said combustion reaction, and wherein said hydrogen supply and oxygen supply are both in fluid communication with said combustor.

29. The closed-loop cooling method for cooling a hydrogen/oxygen based combustor for an underwater vessel of claim 17, further comprising controlling an amount and flow rate of hydrogen and oxygen in said combustor for the combustion reaction, controlling an amount and flow rate of steam condensed into water, and controlling an amount and flow rate of water injected into the combustor.

30. A closed-loop cooling method for cooling a hydrogen/oxygen based combustor for an underwater vessel, the method comprising:

initiating a constant volume combustion reaction between hydrogen and oxygen in a combustion chamber in said combustor to form steam;

condensing the steam from the combustion chamber into water;

injecting the water into the combustor to absorb heat from the combustion chamber; and injecting hot water or steam into the combustion chamber, said hot water or steam being formed by the absorption of heat by the water.

31. The closed-loop cooling method for cooling a hydrogen/oxygen based combustor for an underwater vessel of claim 30, further comprising inducing the absorption of heat by the water by cooling the combustion chamber.

32. An apparatus for cooling a hydrogen/oxygen based combustor for an underwater vessel, said apparatus comprising:

a combustor having a combustion chamber in which a combustion reaction of hydrogen and oxygen produces steam;

a condenser for condensing the steam from the combustion chamber to water;

means for injecting the water from the condenser into the combustor to absorb heat from the combustion chamber;

means for ducting said steam from said combustor to a turbine to rotate a shaft of said turbine; and a gear and clutch system that uses said rotating turbine shaft to turn gear sets of said gear and clutch system to drive a propulsion system for said underwater vessel.

33. A closed-loop cooling method for cooling a hydrogen/oxygen based combustor for an underwater vessel, the method comprising:

initiating a constant volume combustion reaction between hydrogen and oxygen in a combustion chamber in said combustor to form steam;

condensing the steam from the combustion chamber into water;

injecting the water into the combustor to absorb heat from the combustion chamber;

ducting said steam from said combustor to a turbine to rotate a shaft of said turbine; and using said rotating turbine shaft to turn gear sets to drive a propulsion system for said underwater vessel.

* * * * *